United States Patent
Peng et al.

(10) Patent No.: US 10,718,981 B2
(45) Date of Patent: Jul. 21, 2020

(54) LCD DEVICE WITH SELF-COMPENSATED ELECTRODE PATTERNS

(71) Applicant: VastView Technology Inc., Hsinchu County (TW)

(72) Inventors: Cheng Chung Peng, Hsinchu County (TW); Yuhren Shen, Hsinchu County (TW)

(73) Assignee: VastView Technology Inc., Hsinchu County (TW)

( * ) Notice: Subject to any disclaimer, the term of this patent is extended or adjusted under 35 U.S.C. 154(b) by 117 days.

(21) Appl. No.: 16/004,345

(22) Filed: Jun. 9, 2018

(65) Prior Publication Data
US 2018/0356694 A1    Dec. 13, 2018

Related U.S. Application Data

(60) Provisional application No. 62/517,300, filed on Jun. 9, 2017.

(51) Int. Cl.
*G02F 1/1343* (2006.01)
*G02F 1/1362* (2006.01)

(52) U.S. Cl.
CPC .... *G02F 1/134309* (2013.01); *G02F 1/13439* (2013.01); *G02F 1/136286* (2013.01); *G02F 2001/134345* (2013.01)

(58) Field of Classification Search
CPC ........... G02F 1/134309; G02F 1/13439; G02F 2001/134345; G02F 1/136286
USPC .......................................................... 349/142
See application file for complete search history.

(56) References Cited

U.S. PATENT DOCUMENTS

| | | | |
|---|---|---|---|
| 2007/0146608 A1* | 6/2007 | Jin | G02F 1/133514 349/143 |
| 2013/0329177 A1* | 12/2013 | Hsieh | G02F 1/134309 349/141 |
| 2017/0299908 A1* | 10/2017 | Peng | G06F 3/044 |

* cited by examiner

*Primary Examiner* — Nathanael R Briggs
*Assistant Examiner* — William D Peterson
(74) *Attorney, Agent, or Firm* — Lin & Associates Intellectual Property, Inc.

(57) ABSTRACT

An LCD device includes self-compensated ITO patterns. Each pixel area of the LCD device comprises at least two sub-pixel areas and each sub-pixel area is formed with an electrode pattern different from other sub-pixel areas. The at least two sub-pixel areas each have at least two solid electrodes. The two solid electrodes in one sub-pixel area are corresponding to the two solid electrodes in the other sub-pixel area and designed with complimentary dimensions. If the solid electrode in one sub-pixel area has at least one larger size in a longitudinal direction than in a lateral direction, the corresponding solid electrode in the other sub-pixel area has at least one smaller size in the longitudinal direction than in the lateral direction.

10 Claims, 3 Drawing Sheets

LCD DEVICE WITH SELF-COMPENSATED ELECTRODE PATTERNS

CROSS REFERENCE TO RELATED APPLICATIONS

This application is a non-provisional application of provisional U.S. patent application Ser. No. 62/517,300, filed on Jun. 9, 2017, which is incorporated herewith by reference.

BACKGROUND OF THE INVENTION

1. Field of the Invention

The present invention relates generally to a liquid crystal display (LCD) device, and more particularly to an LCD device with self-compensated indium tin oxide (ITO) or indium zinc oxide (IZO) electrode patterns for improving the display quality of the LCD device.

2. Description of Related Arts

An LCD device controls the light transmittance by using the characteristic that liquid crystal (LC) molecules present different light polarization or refraction effects under different alignments so as to produce images. A twisted nematic (TN) LCD device has good light transmittance but an extremely narrow viewing angle as influenced by the structure and optical characteristic of the LC molecules.

To solve the transmittance and viewing angle problems, a twisted vertical alignment model has been proposed so as to provide the high transmittance and the wide viewing angle. However, because the LC molecules are aligned in a vertical alignment manner, when the LC molecules are applied with a low voltage and the LCD device is watched at an inclined viewing angle, a gray-level inversion problem occurs, which causes the problem of color shift at an inclined viewing angle and influences a normal presentation of images of the LCD device.

To resolve this issue, two or more alignment domains are formed in the same pixel to form multi-domain vertical alignment (MVA) LCD device so as to eliminate the gray-level inversion problem and increase the viewing angles. In practice, three specific methods are provided. In the first method, one pixel is divided into multiple sub-pixel areas, and every sub-pixel area forms a different voltage by means of capacitive coupling, thereby producing the alignment effect of multiple sub-pixel areas. In the second method, one pixel is divided into multiple sub-pixel areas and two thin film transistors are used to make each sub-pixel area form a different voltage, thereby solving the gray-level inversion problem. In the third method, the pixel is divided into two or more sub-pixel areas and an electronic barrier material is covered above a part of the electrode of the sub-pixel area, thereby producing the alignment effect of multiple sub-pixel areas.

However, the methods for solving the above mentioned problem in the prior arts have complicated LCD device processes. In view of the above, it is the object of the present invention to provide a simple electrode structure for driving the LCD device with a wider viewing angle so that the LCD device can present optimal display quality.

SUMMARY OF THE INVENTION

The present invention has been made to provide an LCD device with improved display quality in wide viewing angles. In one preferred embodiment, in each pixel area of the LCD device, there is at least two sub-pixel areas formed with different ITO or IZO electrode patterns.

The sub-pixel area of each pixel area comprises at least two electrodes. Each electrode is a solid electrode having a filled polygon shape. In other words, the polygon-shaped electrode has no void inside the electrode. The two solid electrodes in the sub-pixel area are electrically connected.

In one example of the present invention, the two solid electrodes in each sub-pixel area are connected by an electrode segment in the same electrode layer where the two solid electrodes are formed. In the other example, the two solid electrodes in each sub-pixel area are connected by a connection layer different from the electrode layer where the two solid electrodes are formed.

In accordance with one embodiment of the present invention, the electrode pattern in the sub-pixel area may be formed by removing selected areas in the same electrode layer so as to form an electrode segment and two slits on the two sides of the electrode segment that connects the two electrodes. As a result, the entire electrode pattern is either I-shaped or H-shaped.

According to the present invention, the dimensions of the solid electrodes in each sub-pixel area are designed in such a way so as to compensate for the characteristics of the voltage-dependent normalized transmittance (VT) curve at the off-axis viewing direction of the LCD device. If the solid electrode in one sub-pixel area is designed with a larger size in a lateral direction than in a longitudinal direction, a corresponding solid electrode in one other sub-pixel area is designed with a smaller size in the lateral direction than in the longitudinal direction.

BRIEF DESCRIPTION OF THE DRAWINGS

The present invention will be apparent to those skilled in the art by reading the following detailed description of preferred embodiments thereof, with reference to the attached drawing, in which.

DETAILED DESCRIPTION OF THE PREFERRED EMBODIMENT

Figure 1:
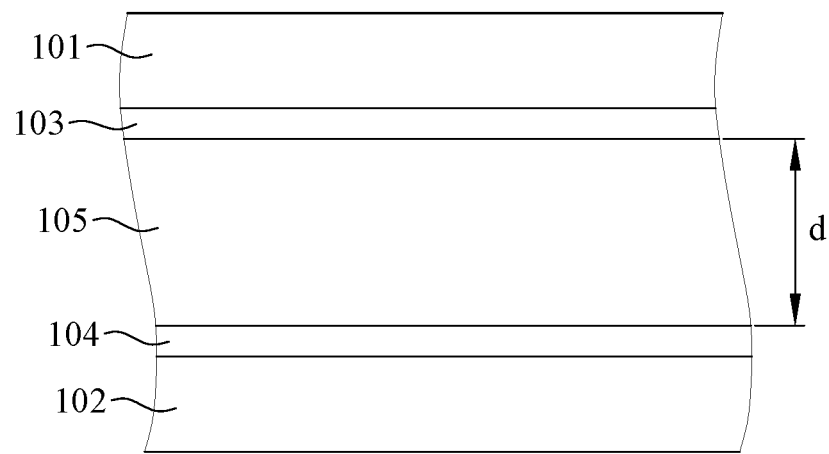
FIG. 1 shows a cross sectional view of an LCD device according to the present invention.

The accompanying drawings are included to provide a further understanding of the invention, and are incorporated in and constitute a part of this specification. The drawing illustrates embodiments of the invention and, together with the description, serves to explain the principles of the invention.

With reference to FIG. 1, an LCD device according to the present invention comprises a first substrate 101, a second substrate 102, a first electrode layer 103, a second electrode layer 104 and a liquid crystal layer 105 between the first and second electrode layers. The first and second substrates are opposite to each other and the liquid crystal layer 105 is disposed between the two substrates. The first and second electrode layers are formed on the first and second substrates respectively by transparent conductive film such as ITO or IZO.

The liquid crystal molecules in the liquid crystal layer comprise a nematic liquid crystal material such as a nematic liquid crystal material with negative dielectric anisotropy. Substance having optical chirality is added in the liquid crystal layer. For example, an optically chiral dopant is added to the liquid crystal layer so that the liquid crystal molecules are twisted along an axis to result in optical chirality. The substance having optical chirality may have left or right twisting chirality. In order for the liquid crystal molecules to have enough space for twisting, it is preferred that the ratio of the thickness d of the liquid crystal layer to the pitch p of the optically chiral substance is between 0.16 and 0.42.

According to one embodiment of the present invention, each pixel area of the LCD device with self-compensated electrode patterns includes at least two sub-pixel areas and each sub-pixel area includes at least two electrically connected electrodes. The electrodes of each pixel area are solid electrodes. Each electrode is polygon shaped without any void inside the electrode. The polygon can be a triangle, a quadrilateral, a pentagon, or a hexagon. A preferred embodiment is that each sub-pixel region has only two electrodes, and each electrode is a solid polygonal electrode.

Figure 2:
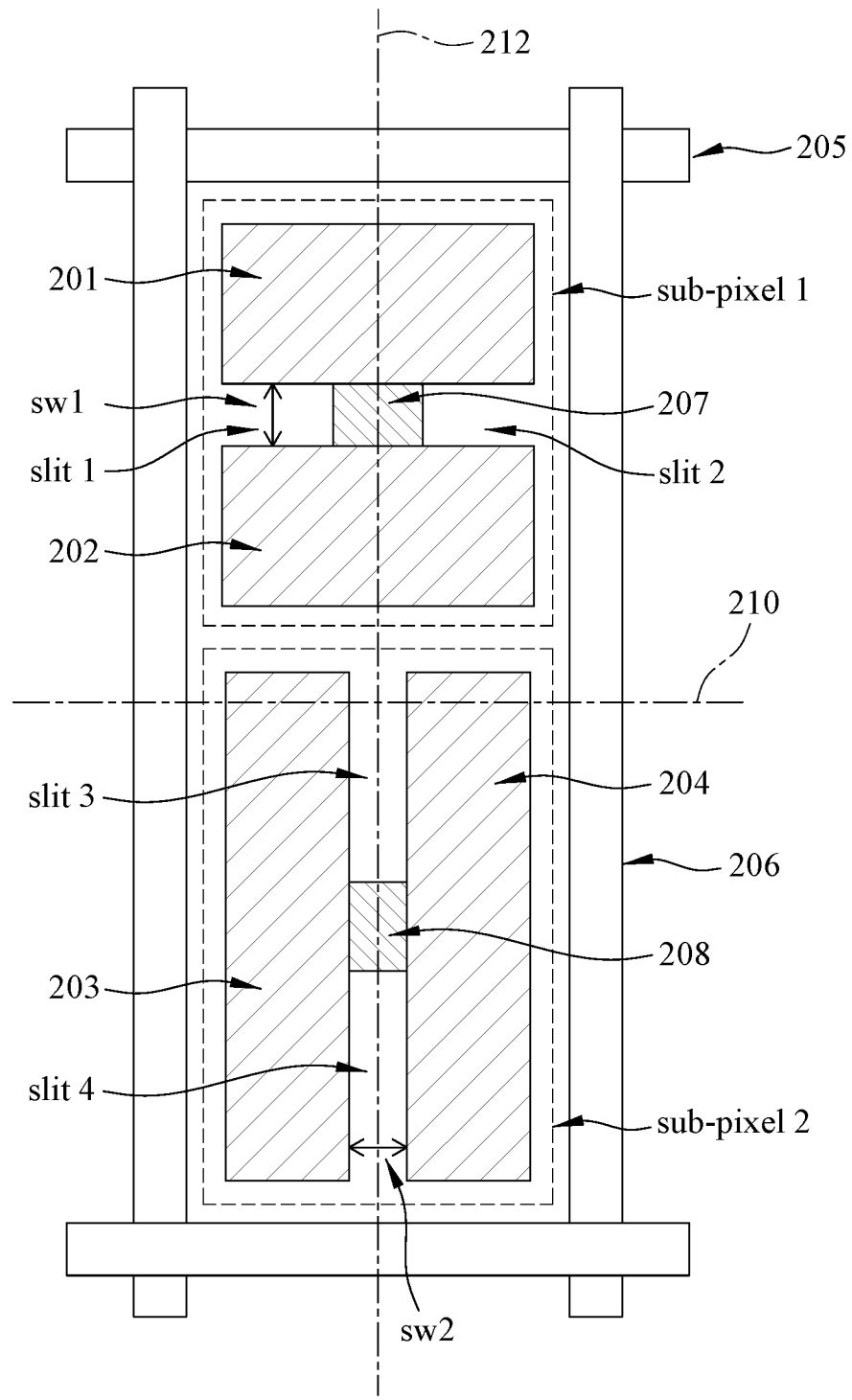
FIG. 2 shows an example of the self-compensated electrode patterns in a pixel area of an LCD device according to the present invention.

FIG. 2 shows an example of the self-compensated electrode patterns in a pixel area of an LCD device according to the present invention. The pixel area is defined by the gate line 205 and the data line 206 of the LCD device. Each pixel area comprises sub-pixel 1 and sub-pixel 2. Preferably, the ratio of the size of the sub-pixel 1 area to the size of the sub-pixel 2 area is between ⅓ and ¾.

In the area of sub-pixel 1, there are electrode 201 and electrode 202 electrically connected. Similarly, in the area of sub-pixel 2, there are electrode 203 and electrode 204 electrically connected. A vertical reference line 212 passing through the center of the pixel area is parallel to the data line 206 and a horizontal reference line 210 passing through the center of the pixel area is parallel to the gate line 205.

In order to improve the off-axis display quality under wider viewing angles, the electrode patterns in the two sub-pixel areas are designed to compensate for the characteristics of the off-axis VT curve of the LCD device. For example, if the solid electrode 201 or 202 in sub-pixel 1 is designed with at least one larger size in a lateral direction than in a longitudinal direction, the corresponding solid electrode 203 or 204 in sub-pixel 2 should be designed with at least one smaller size in the lateral direction than in the longitudinal direction.

To the contrary, if the solid electrode 201 or 202 in sub-pixel 1 is designed with at least one smaller size in the lateral direction than in the longitudinal direction, the corresponding solid electrode 203 or 204 in sub-pixel 2 should be designed with at least one larger size in the lateral direction than in the longitudinal direction. The solid electrode 201 or 202 has at least one smaller size in the longitudinal direction than the size of the solid electrode 203 or 204 in the longitudinal direction. The solid electrode 201 or 202 has at least one larger size in the lateral direction than the size of the solid electrode 203 or 204 in the lateral direction.

According to the characteristics of the off-axis VT curve, if sub-pixel 1 has a better display quality than sub-pixel 2 at off-axis $(\theta, \varphi) = (60, 0)$ viewing angle, sub-pixel 2 would have a better display quality than sub-pixel 1 at off-axis $(\theta, \varphi) = (60, 90)$ viewing angle, where $\theta$ and $\varphi$ are symbols for polar and azimuth angles. As a result, the solid electrodes designed with complimentary dimensions in the two sub-pixel areas as described above can compensate for each other to improve the off-axis display quality of the LCD device.

In a preferred embodiment as shown in FIG. 2, there are two sub-pixel areas in each pixel area. Electrode 201 in sub-pixel 1 has the same shape as electrode 202 in sub-pixel 1, and electrode 203 in sub-pixel 2 has the same shape as electrode 204 in sub-pixel 2. The electrodes in the pixel area are all rectangular shaped solid electrodes. It should be noted that electrodes 201 and 202 in sub-pixel 1 are electrically connected by an electrode segment in the same electrode layer as electrodes 201 and 202 in sub-pixel 1. Electrodes 203 and 204 in sub-pixel 2 are also electrically connected by an electrode segment in the same electrode layer as electrodes 203 and 204.

As shown in FIG. 2, electrodes 201 and 202 in sub-pixel 1 each have a horizontal length greater than the vertical length, and electrodes 203 and 204 in sub-pixel 2 each have a horizontal length smaller than the vertical length. The entire electrode pattern of sub-pixel 1 may be $\mathrm{I}$-shaped and made by removing selected electrode areas in the electrode layer to form an electrode segment 207 and two slits, i.e., slit 1 and slit 2, with slit width sw1 between electrode 201 and electrode 202.

In the example shown in FIG. 2, two selected electrode areas in sub-pixel 1 are removed, i.e., at least an even number of electrode areas are removed to form an electrode pattern with an even number of slits. The electrode pattern in sub-pixel 1 is left-right symmetrical with respect to the vertical reference line 212.

Similarly, the entire electrode pattern of sub-pixel 2 may be H-shaped and made by removing selected areas in the electrode layer to form an electrode segment 208 and two slits, i.e., slit 3 and slit 4, with slit width sw2 between electrode 203 and electrode 204. Preferably, sw1 is less or equal to sw2. In this example, the slits in sub-pixel 1 or sub-pixel 2 may be formed on the same line or different line. In other words, the two slits in a sub-pixel may have position difference. The slit width may also be non-uniform with slit width being narrower in area closer to the center of the sub-pixel.

In some variation, each pixel area of the LCD device of the present invention may have one sub-pixel area, i.e., sub-pixel 1 or sub-pixel 2. Under this situation, the electrode pattern in the sub-pixel area is left-right symmetric with respect to the vertical reference line. The electrode pattern in the sub-pixel area is also top-bottom symmetric with respect to horizontal reference line that passes through the center of the sub-pixel area.

With reference to FIG. 2, the two slits with width sw1 in sub-pixel 1 are parallel to the horizontal reference line 210. In the present invention, it is preferred that the width sw1 is greater than half of the thickness d of the liquid crystal layer but less than twice of the thickness d, i.e., $0.5d < sw1 < 2d$. The two slits with width sw2 are parallel to the vertical reference line 212. The width sw2 should be greater than half of the thickness d and less than twice of the thickness d, preferably $1.5d < sw2 < 2d$. For each slit with length L and width W, L should be greater than W, and preferably $L > 1.5 W$.

Figure 3:
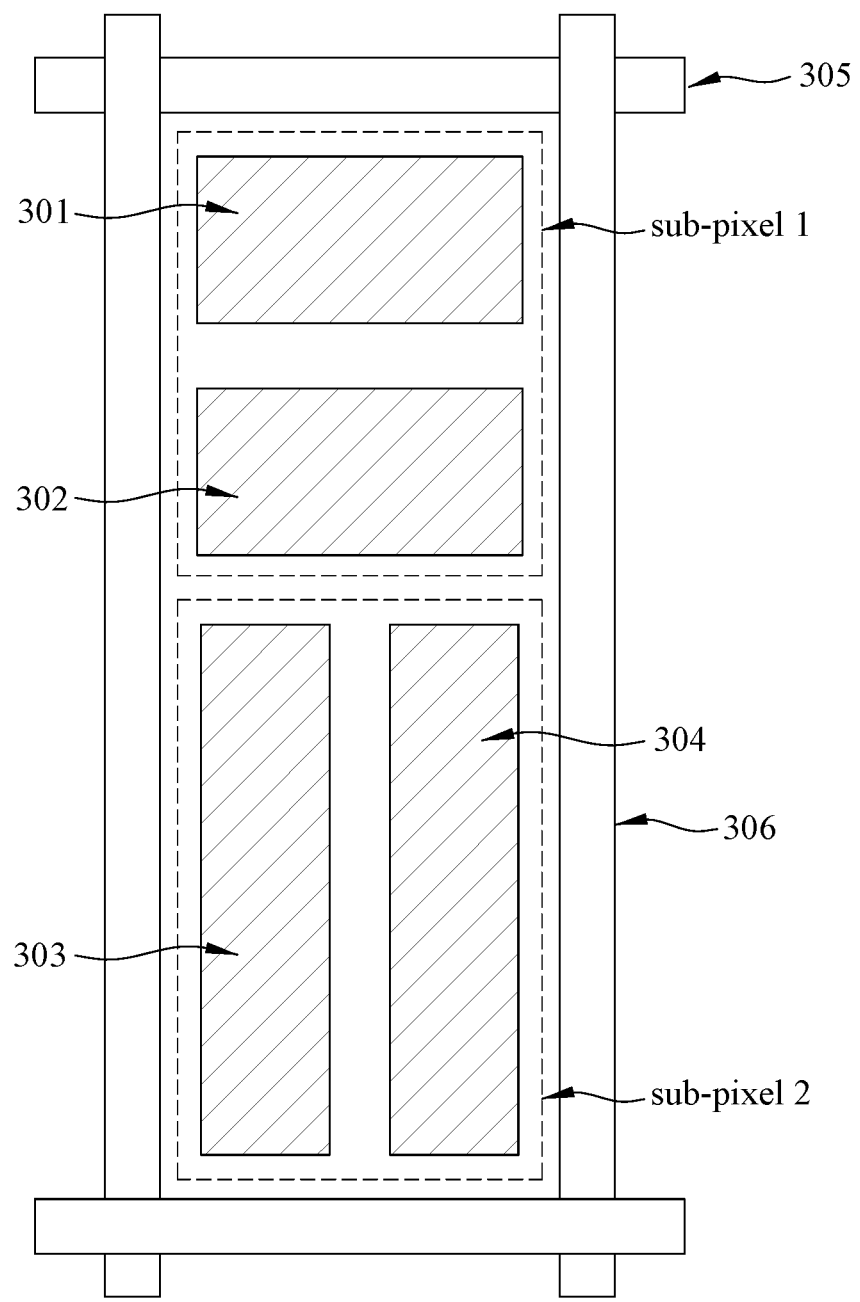
FIG. 3 shows another example of the self-compensated electrode patterns in a pixel area of an LCD device according to the present invention.

FIG. 3 shows another example of the self-compensated electrode patterns in a pixel area of an LCD device according to the present invention. In this example, each pixel area defined by the gate line 305 and the data line 306 also comprises sub-pixel 1 and sub-pixel 2. In the area of sub-pixel 1, there are also two electrodes 301 and 302. Similarly, in the area of sub-pixel 2, there are two electrodes 303 and 304.

As shown in FIG. 3, the electrodes in the pixel area are all rectangular shaped with the electrode structure and size similar to those in FIG. 2. However, the electrodes 301 and 302 in sub-pixel 1 are electrically connected in a layer different from the electrode layer of electrodes 301 and 302. The electrodes 303 and 304 are also electrically connected in a layer different from the electrode layer of electrodes 303 and 304.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An LCD device having a plurality of pixel areas, each pixel area having at least two sub-pixel areas and comprising:
   a first substrate formed with a first electrode layer;
   a second substrate formed with a second electrode layer, the second substrate being opposite to the first electrode layer;
   a liquid crystal layer disposed between the first and second substrates, the liquid crystal layer having optically chiral dopants added therein;
   a first sub-pixel area having at least two electrically connected solid electrodes formed in the first electrode layer, the at least two electrically connected solid electrodes having at least one larger size in a longitudinal direction than in a lateral direction;
   a second sub-pixel area having at least two electrically connected solid electrodes formed in the first electrode layer, the at least two electrically connected solid electrodes of the second sub-pixel area having at least one smaller size in the longitudinal direction than in the lateral direction.

2. The LCD device as claimed in claim 1, wherein a ratio between the size of the first sub-pixel area and the size of the second sub-pixel area is between ⅓ and ¾.

3. The LCD device as claimed in claim 1, wherein at least one of the at least two electrodes in the first sub-pixel area and the at least two electrodes in the second sub-pixel area is polygon-shaped solid electrode.

4. The LCD device as claimed in claim 1, wherein at least one of the at least two electrodes in the first sub-pixel area and the at least two electrodes in the second sub-pixel area is a quadrilateral-shaped solid electrode.

5. The LCD device as claimed in claim 1, wherein at least one of the at least two electrodes in the first sub-pixel area and the at least two electrodes in the second sub-pixel area is a triangle-shaped solid electrode.

6. The LCD device as claimed in claim 1, wherein the liquid crystal layer has a thickness d and at least one slit is formed between the at least two electrodes in the first sub-pixel area with a slit width sw1, where $0.5d < sw1 < 2d$.

7. The LCD device as claimed in claim 1, wherein the liquid crystal layer has a thickness d and at least one slit is formed between the at least two electrodes in the second sub-pixel area with a slit width sw2, where $1.5d < sw2 < 2d$.

8. The LCD device as claimed in claim 1, wherein the at least two electrodes in the first sub-pixel area are connected by an electrode segment in the first electrode layer to form an $\mathrm{I}$-shaped electrode pattern, and the at least two electrodes in the second sub-pixel area are connected by an electrode segment in the first electrode layer to form an H-shaped electrode pattern.

9. The LCD device as claimed in claim 8, wherein the liquid crystal layer has a thickness d, two slits are formed between the at least two electrodes on two sides of the electrode segment in the first sub-pixel area each with a slit width sw1, and two slits are formed between the at least two electrodes on two sides of the electrode segment in the second sub-pixel area each with a slit width sw2, where $0.5d < sw1 < 2d$ and $1.5d < sw2 < 2d$.

10. The LCD device as claimed in claim 1, wherein the at least two electrodes in the first sub-pixel area has at least one smaller size in a longitudinal direction than the size of the at least two electrodes in the second sub-pixel area in the longitudinal direction, and the at least two electrodes in the first sub-pixel area has at least one larger size in a lateral direction than the size of the at least two electrodes of the second sub-pixel area in the lateral direction.

* * * * *